March 24, 1931. F. C. McMANUS 1,797,873
COMBINED GAS TANK AND RUNNING BOARD APRON
Filed June 6, 1929
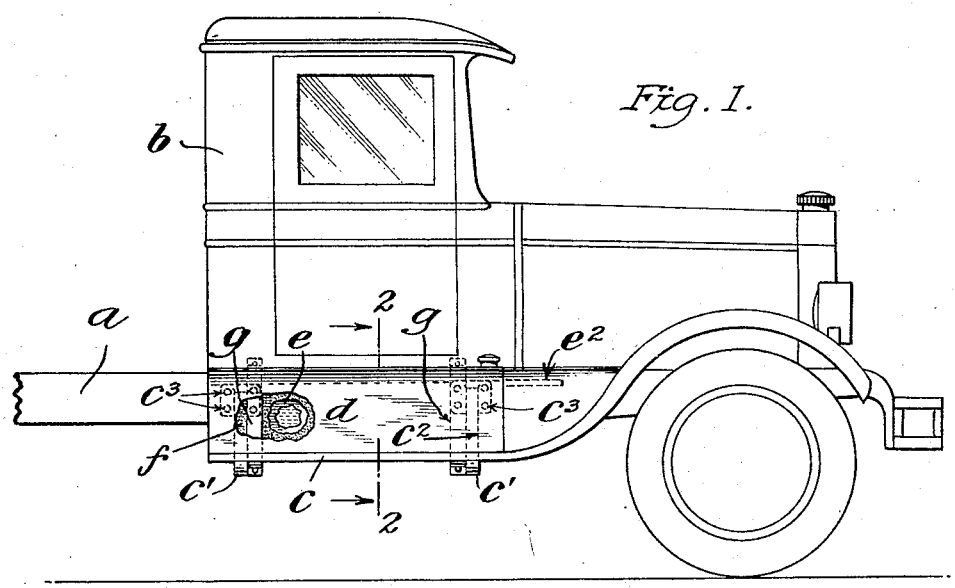
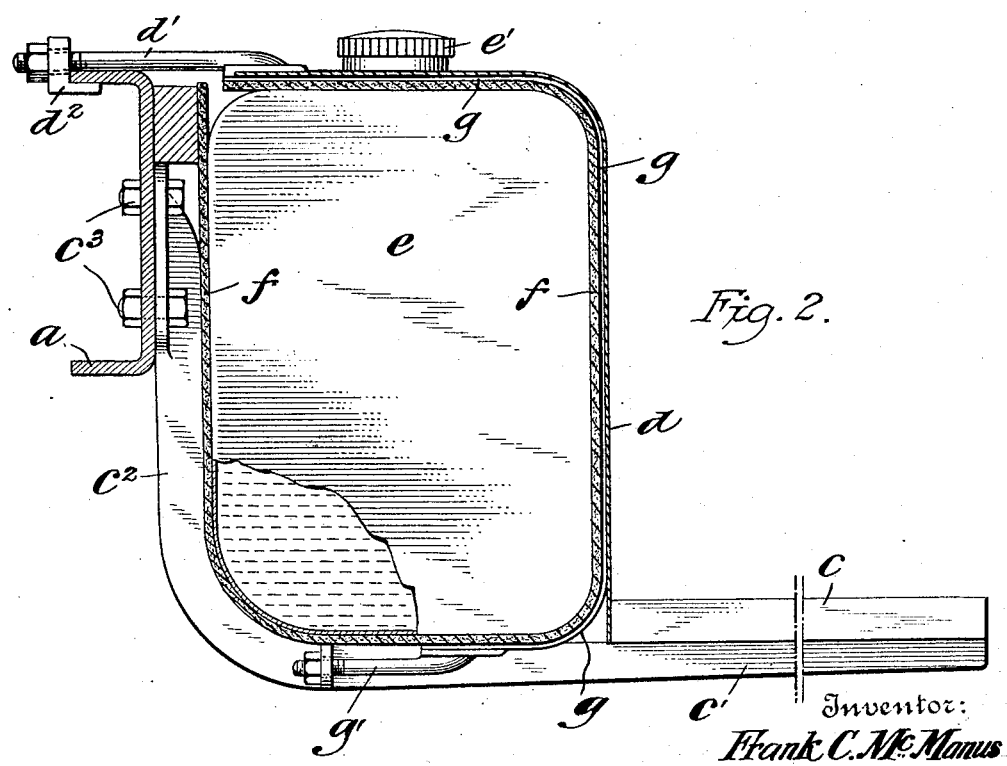
Inventor:
Frank C. McManus
By his Attorneys
Redding, Greeley, O'Shea & Campbell Patented Mar. 24, 1931

1,797,873

UNITED STATES PATENT OFFICE

FRANK C. McMANUS, OF BROOKLYN, NEW YORK, ASSIGNOR TO INTERNATIONAL MOTOR COMPANY, OF NEW YORK, N. Y., A CORPORATION OF DELAWARE

COMBINED GAS TANK AND RUNNING-BOARD APRON

Application filed June 6, 1929. Serial No. 368,961.

The present invention relates to mountings for fuel tanks on motor vehicles and embodies, more specifically, an improved form of tank mounting in which the running board apron cooperates with the tank structure to provide a combined running board apron and gas tank.

In commercial vehicles, such as busses, the disposition of the gasoline tank has presented quite a problem and it has been difficult to provide sufficient room for an adequate tank in a convenient location upon the chassis. The vehicle body usually has been so large that it has been necessary to place the filler cap and inlet to the tank within the confines of the body, the vent from the gas tank thus lying inside of the body and causing the presence of the smell of gasoline. The gas tank heretofore so located, has also interfered with the proper distribution and positioning of the elements of the body and frame, and the inaccessibility of such locations has been highly undesirable.

The present invention combines within the structure of the running board, the gasoline tank, its location being highly convenient and accessible.

An object of the invention, therefore, is to provide a gasoline tank mounting of such character that the smell of gasoline will not get into the vehicle body.

A further object of the invention is to provide a tank mounting of the above character, the inlet to the tank being in a convenient position whereby the tank may be readily refilled.

Further objects and advantages, not specifically enumerated above, will be apparent as the invention is described in greater detail in connection with the accompanying drawings, wherein:

Figure 1 is a view in side elevation, partly broken away and in section, showing the forward end of a vehicle chassis provided with a gasoline tank mounting in accordance with the present invention.

Figure 2 is a view in section, taken on line 2—2 of Figure 1, and looking in the direction of the arrows.

Referring to the above drawings, $a$ designates a vehicle frame carrying a conventional body $b$. The running board is shown at $c$ and is carried by arm $c'$ having risers $c^2$ secured to the frame $a$ by means of bolts $c^3$.

Instead of following the riser $c^2$ and arm $c'$, the apron $d$ is spaced therefrom, as clearly shown in Figure 2, and secured to the frame $a$ by means of bolt $d'$ and clamp $d^2$ and to the running board by means of screws or any other well known form of securing device.

A gasoline tank $e$ is carried between the apron and the arm $c'$ and riser $c^2$ and, if desired, anti-squeak strips $f$ are provided. Straps $g$ and bolts $g'$ may be used to anchor the tank to the risers if desired, the straps being welded to the bolts $d'$. The tank inlet is shown at $e'$ and a gasoline feed line $e^2$ communicates between the tank and carbureter.

From the foregoing description, it will be apparent that the smell of gasoline will not penetrate into the body of the vehicle and the positioning of the tank and inlet is a highly convenient one. The tank structure does not interfere with any of the seats or other elements of the body and no restriction is thereby placed upon the body or other equipment. A short fuel line only is necessary from the forward end of the tank to the pump on the carbureter and there is no need for running fuel lines adjacent the exhaust system. The exposed position of the tank maintains a low fuel temperature and proper balance of the elements on the chassis may be had by placing the battery and tool box upon the driver's side of the chassis. Where it is desired that the chassis be sold without the cab, the disposition of the tank or its filler would not be affected and the structure is a highly advantageous one.

It will be understood, of course, that the apron wall itself may form one side of the gasoline tank and the structure may be redesigned to suit individual installations without departing from the scope of the invention as defined in the appended claim.

I claim as my invention:

In combination with a vehicle frame, a running board, brackets formed with risers for securing the running board to the frame, an apron carried by the brackets, and a fuel tank carried between the risers and the apron, means to anchor the apron to the frame, and independent means to anchor the tank to the brackets.

This specification signed this 3rd day of June A. D. 1929.

FRANK C. McMANUS.